United States Patent
Han

(10) Patent No.: US 12,464,593 B2
(45) Date of Patent: Nov. 4, 2025

(54) ACCESS CONTROL METHOD AND APPARATUS, AND STORAGE MEDIUM AND TERMINAL

(71) Applicant: SPREADTRUM COMMUNICATIONS (SHANGHAI) CO., LTD., Shanghai (CN)

(72) Inventor: Lifeng Han, Shangai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 401 days.

(21) Appl. No.: 17/926,769

(22) PCT Filed: May 8, 2021

(86) PCT No.: PCT/CN2021/092250
§ 371 (c)(1),
(2) Date: Nov. 21, 2022

(87) PCT Pub. No.: WO2021/233135
PCT Pub. Date: Nov. 25, 2021

(65) Prior Publication Data
US 2023/0209636 A1    Jun. 29, 2023

(30) Foreign Application Priority Data
May 20, 2020 (CN) .......................... 202010432357.2

(51) Int. Cl.
*H04W 76/20* (2018.01)
*H04W 76/40* (2018.01)

(52) U.S. Cl.
CPC ........... *H04W 76/20* (2018.02); *H04W 76/40* (2018.02)

(58) Field of Classification Search
CPC ....... H04W 76/11; H04W 48/16; H04W 4/08; H04W 8/08; H04W 84/12; H04W 72/30;
(Continued)

(56) References Cited

U.S. PATENT DOCUMENTS 8,706,897 B2    4/2014  Wadhwa et al.
9,060,247 B2 *  6/2015  Yang ..................... G01S 5/0036
(Continued)

FOREIGN PATENT DOCUMENTS

CN    101790205 A    7/2010
CN    101827306 A    9/2010
(Continued)

OTHER PUBLICATIONS

International Search Report for International Application No. PCT/CN2021/092250; Date of Mailing, Aug. 13, 2021.
(Continued)

*Primary Examiner* — Jung Liu
(74) *Attorney, Agent, or Firm* — CANTOR COLBURN LLP

(57) ABSTRACT

Provided are an access control method and terminal. The method includes: determining a transmission mode according to a service type of data to be transmitted; and selecting an access control parameter corresponding to the determined transmission mode to perform an access control. Transmission modes include a unicast transmission mode and a multicast/broadcast transmission mode, and different transmission modes correspond to different access control parameters.

9 Claims, 1 Drawing Sheet

(58) Field of Classification Search
CPC ...... H04W 4/06; H04W 80/02; H04L 12/189; H04L 61/5061; H04L 12/1845
See application file for complete search history.

(56) References Cited

U.S. PATENT DOCUMENTS

| | | | |
|---|---|---|---|
| 9,774,999 B2* | 9/2017 | Smith | G01S 5/0289 |
| 9,838,838 B2* | 12/2017 | Rhee | G01S 19/51 |
| 9,838,997 B2* | 12/2017 | Smith | H04W 4/08 |
| 9,860,868 B2* | 1/2018 | Smith | H04W 4/90 |
| 11,860,291 B2* | 1/2024 | Swindell | H04W 4/029 |
| 2012/0286997 A1* | 11/2012 | Lin | G01S 5/0252 342/451 |
| 2013/0044596 A1 | 2/2013 | Zhi et al. | |
| 2020/0045753 A1* | 2/2020 | Dao | H04W 4/08 |
| 2020/0120580 A1 | 4/2020 | Jin et al. | |
| 2020/0288506 A1* | 9/2020 | Lei | H04W 74/0833 |
| 2020/0323024 A1 | 10/2020 | Huang et al. | |
| 2020/0344576 A1* | 10/2020 | Li | H04W 4/06 |
| 2021/0058748 A1* | 2/2021 | Liao | H04W 76/11 |
| 2021/0092611 A1* | 3/2021 | Pasricha | H04W 4/33 |
| 2021/0282033 A1* | 9/2021 | Lai | H04W 16/22 |
| 2022/0086607 A1* | 3/2022 | Ali | H04W 4/06 |
| 2022/0150871 A1* | 5/2022 | Luo | H04L 1/1822 |
| 2023/0023919 A1* | 1/2023 | Qi | H04W 72/30 |
| 2023/0062443 A1* | 3/2023 | Chakraborty | H04W 24/04 |

FOREIGN PATENT DOCUMENTS

| | | |
|---|---|---|
| CN | 101959281 A | 1/2011 |
| CN | 101969635 A | 2/2011 |
| CN | 108282751 A | 7/2018 |
| CN | 109151906 A | 1/2019 |
| CN | 109982266 A | 7/2019 |
| CN | 111132224 A | 5/2020 |
| WO | 2018028717 A1 | 2/2018 |

OTHER PUBLICATIONS

SIPO Second Examination Opinion Notice for corresponding CN Application No. 202010432357.2; Issued Sep. 29, 2024.
SIPA First Office Action for corresponding CN Application No. 202010432357.2; Issued Feb. 29, 2024; 12 pages.

* cited by examiner

ACCESS CONTROL METHOD AND APPARATUS, AND STORAGE MEDIUM AND TERMINAL

CROSS REFERENCE TO RELATED APPLICATIONS

This is the U.S. national stage of application No. PCT/CN2021/092250, filed on May 8, 2021. Priority under 35 U.S.C. § 119(a) and 35 U.S.C. § 365(b) is claimed from Chinese Application No. 202010432357.2, filed May 20, 2020, the disclosure of which is also incorporated herein by reference.

FIELD

The present disclosure relates to the technical field of communications, and in particular, to an access control method and apparatus, a storage medium and a terminal.

BACKGROUND

As specified in conventional protocols, an access control solution used when user equipment (UE) initiates a service is only for unicast services. For broadcast/multicast services, UE does not need to enter a connected status when initiating a service, and therefore an access control solution for broadcast/multicast services is not provided in the conventional technology.

However, with the development of communication technology, there are various types of services. Some services which need to be initiated in a broadcast/multicast transmission mode have high service requirements, and thus UE needs to enter a connected status when initiating the transmission in the broadcast/multicast transmission mode.

However, an access control solution corresponding to a process of a radio resource control (RRC) establishment/re-establishment of a broadcast/multicast service has not been provided in the conventional technology, which affects the reliability of communication service.

SUMMARY

The technical problem solved by the present disclosure is how to improve the reliability of multicast/broadcast services.

To solve the above technical problem, an access control method is provided in an embodiment of the present disclosure. The method includes determining a transmission mode according to a service type of data to be transmitted; and selecting an access control parameter corresponding to the determined transmission mode to perform an access control. Transmission modes include a unicast transmission mode and a multicast/broadcast transmission mode, and different transmission modes correspond to different access control parameters.

In an embodiment, the access control parameter includes a NAS access control parameter, and different transmission modes correspond to different NAS access control parameters.

In an embodiment, the access control parameter includes an AS access control parameter, and different transmission modes correspond to different AS access control parameters.

In an embodiment, the AS access control parameter corresponding to the multicast/broadcast transmission mode is acquired by applying an offset to the AS access control parameter corresponding to the unicast transmission mode.

In an embodiment, an access control parameter corresponding to a transmission mode is acquired through at least one of the following ways: being configured by a protocol, being configured by a core network, and being acquired by system information.

In an embodiment, the access control parameter includes a NAS access control parameter and an AS access control parameter. The NAS access control parameter includes a mapping relationship table between an access category and one or more access IDs. For a same access category, different transmission modes correspond to different AS access control parameters.

In an embodiment, the service type includes a type of a service that needs to perform data transmission using the multicast/broadcast transmission mode under a RRC connected status.

In order to solve the above technical problem, an access control apparatus is provided in an embodiment of the present disclosure. The apparatus includes: a determination module, configured to determine a transmission mode according to a service type of data to be transmitted; and an access control module, configured to select an access control parameter corresponding to the determined transmission mode to perform an access control. Transmission modes include a unicast transmission mode and a multicast/broadcast transmission mode, and different transmission modes correspond to different access control parameters.

In order to solve the above technical problem, a storage medium is further provided in an embodiment of the present disclosure. The storage medium stores computer instructions which, when executed by a processor, cause steps of the above method to be implemented.

To solve the above technical problem, a terminal is further provided in an embodiment of the present disclosure. The terminal includes a memory and a processor. The memory stores computer instructions executable on the processor, and the processor, when executing the computer instructions, is configured to implement steps of the above method.

Compared with the conventional technology, the technical solutions of the embodiments of the present disclosure have the following beneficial effects.

The access control method according to the embodiment of the present disclosure includes determining a transmission mode according to a service type of data to be transmitted; and selecting an access control parameter corresponding to the determined transmission mode to perform an access control. Transmission modes include a unicast transmission mode and a multicast/broadcast transmission mode, and different transmission modes correspond to different access control parameters. With the solution of the embodiment, different access control parameters can be selected according to different transmission modes of services when initiating services, thereby realizing different access controls, which is beneficial to improve the reliability of multicast/broadcast services.

DETAILED DESCRIPTION

As mentioned in the background part, an access control solution corresponding to a process of RRC establishment/ re-establishment of a broadcast/multicast service has not been provided in the conventional technology, which affects the reliability of communication service.

To solve the above technical problem, an access control method is provided in an embodiment of the present disclosure. The method includes determining a transmission mode according to a service type of data to be transmitted; and selecting an access control parameter corresponding to the determined transmission mode to perform an access control. Transmission modes include a unicast transmission mode and a multicast/broadcast transmission mode, and different transmission modes correspond to different access control parameters.

With the solution of the embodiment, different access control parameters can be selected according to different transmission modes of services when initiating services, thereby realizing different access controls, which is beneficial to improve the reliability of multicast/broadcast services.

In order to make the above objects, features, and beneficial effects of the present disclosure clearer, specific embodiments of the present disclosure will be described in detail below with reference to the accompanying drawings.

Figure 1:
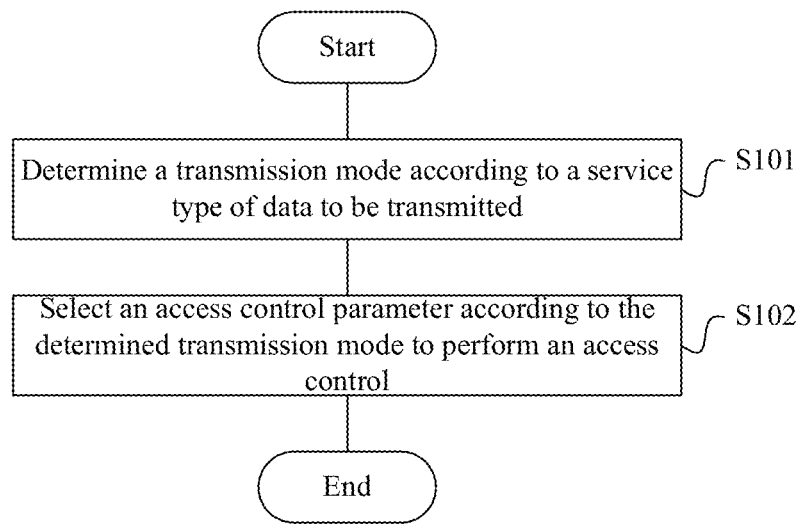
FIG. 1 is a flowchart of an access control method according to an embodiment of the present disclosure.

FIG. 1 is a flowchart of an access control method according to an embodiment of the present disclosure. The solution of this embodiment may be applied to a user equipment side. For example, the solution of this embodiment may be performed by UE at the user equipment side. The solution of this embodiment may be applied to a scenario of a downlink data transmission, such as an application scenario of RRC connection establishment/re-establishment triggered by a broadcast/multicast service.

In a specific implementation, the access control method provided in the following steps S101 to S102 may be executed by a chip with a function of a RRC connection establishment or re-establishment in the user equipment or may be executed by a baseband chip in the user equipment.

Specifically, referring to FIG. 1, the access control method described in this embodiment may include the following steps S101 and S102.

In step S101, a transmission mode is determined according to a service type of data to be transmitted.

In step S102, an access control parameter corresponding to the determined transmission mode is selected to perform an access control.

Transmission modes include a unicast transmission mode and a multicast/broadcast transmission mode, and different transmission modes correspond to different access control parameters.

For example, in the step S101, it may be determined whether to adopt the unicast transmission mode or the multicast/broadcast transmission mode, according to the service type of the data to be transmitted. And, if the multicast/broadcast transmission mode is adopted, it is determined whether the UE needs to enter a RRC connected status.

Further, the data to be transmitted is downlink data to be received.

In a specific implementation, the access control parameter may include a non-access stratum (NAS) access control parameter and an access stratum (AS) access control parameter.

Specifically, different transmission modes correspond to different NAS access control parameters.

Further, different transmission modes correspond to different AS access control parameters.

In a specific implementation, an access control parameter corresponding to a transmission mode may be configured by a protocol.

For example, a protocol configures a mapping relationship between services transmitted in a unicast transmission mode and NAS access control parameters, and also configures a mapping relationship between services transmitted in a multicast/broadcast transmission mode and NAS access control parameters.

For a certain service type, the UE may map two sets of NAS access control parameters. That is, one set of parameters corresponds to data transmission in the unicast transmission mode, and the other set of parameters corresponds to data transmission in the multicast/broadcast transmission mode.

Further, when performing an access control at the AS, the UE may select a NAS access control parameter corresponding to the transmission mode of the data.

For example, if the data is transmitted in the unicast transmission mode, the UE may select a mapping table corresponding to the unicast transmission mode to acquire the NAS access control parameter.

For another example, if the data is transmitted in the multicast/broadcast transmission mode, the UE may select a mapping table corresponding to the multicast/broadcast transmission mode to acquire the NAS access control parameter.

In a specific implementation, the NAS access control parameter may include a mapping relationship table between an access category and one or more access IDs (access identity).

Further, by configuring the mapping relationship between services in the multicast/broadcast transmission mode and NAS access control parameters, it is also possible to instruct the terminal to receive the service through multicast/broadcast in the RRC connected status. For example, the service type includes a type of a service that needs to perform data transmission using the multicast/broadcast transmission mode under the RRC connected status. The UE may determine whether this data transmission needs to be performed under the RRC connected status, according to whether there is a NAS access control parameter corresponding to the multicast/broadcast transmission mode adopted by the service type.

Thus, with the solution of this embodiment, the UE can select different NAS access control parameters according to different transmission modes adopted by services when initiating the services, thereby realizing different access controls.

In a specific implementation, an access control parameter corresponding to a transmission mode may be configured by a core network.

Specifically, for a service transmitted in the multicast/broadcast transmission mode, the core network may notify the terminal of a mapping relationship between services and NAS access control parameters through NAS signaling. Thus, the terminal may acquire the NAS access control parameter corresponding to the service transmitted in the multicast/broadcast transmission mode.

For example, the core network may notify the terminal of the mapping relationship between services transmitted in the multicast/broadcast transmission mode and NAS access control parameters through a process such as multicast announcement and UE re-registration.

Further, when performing an access control at the AS, the UE may select a NAS access control parameter corresponding to the transmission mode of the data to be transmitted.

For example, if the data is transmitted in the unicast transmission mode, the UE may select a mapping table corresponding to the unicast transmission mode to acquire the NAS access control parameter.

For another example, if the data is transmitted in the multicast/broadcast transmission mode, the UE may select a mapping table corresponding to the multicast/broadcast transmission mode to acquire the NAS access control parameter.

Thus, with the solution of this embodiment, the UE can select different NAS access control parameters according to different transmission modes adopted by services when initiating the services, thereby realizing different access controls.

In a specific implementation, an access control parameter corresponding to a transmission mode may be acquired through system information.

Specifically, the base station may configure a set of AS access control parameters for a service transmitted in the multicast/broadcast transmission mode, and the AS access control parameters may include uac-BarringFactor, which is used to indicate an access probability. The AS access control parameters may also include uac-BarringTime, which is used to calculate a minimum time interval from an access failure to a next access attempt procedure for a same access category. The AS access control parameters may also include uac-BarringForAccessIdentity, which is used to indicate whether each access ID is allowed to be accessed.

Further, the AS access control parameter may be sent through system information.

Further, the UE may acquire, from the system information, an AS access control parameter corresponding to the unicast transmission mode corresponding to an access category, and an AS access control parameter corresponding to the multicast/broadcast transmission mode corresponding to the access category, respectively.

In a specific implementation, when the UE performs the access control, for a same access category, different transmission modes may correspond to different AS access control parameters.

For example, if it is determined in step S101 that a unicast transmission mode is adopted, then, when performing access control in step S102, the AS access control parameter corresponding to the unicast transmission mode in the system information are used to perform operations related to access control.

For another example, if it is determined in step S101 that a multicast/broadcast transmission mode is adopted, then, when performing access control in step S102, the AS access control parameter corresponding to the multicast/broadcast transmission mode in the system information are used to perform operations related to access control.

Therefore, with the solution of this embodiment, during an access control at the AS, the UE can use different access control parameters corresponding to different data transmission modes to perform the access control.

In a specific implementation, the AS access control parameter corresponding to the multicast/broadcast transmission mode may be acquired by applying an offset to the AS access control parameter corresponding to the unicast transmission mode. Therefore, the protocol, core network or base station each does not need to configure two different sets of access control parameters, but to acquire the access control parameter for the multicast/broadcast transmission mode by applying a certain offset on the basis of the access control parameter corresponding to the existing unicast transmission mode.

For example, the uac-BarringFactor corresponding to the multicast/broadcast transmission mode may be acquired by adding a first offset (offset1) to the uac-BarringFactor corresponding to the unicast transmission mode.

Alternatively, the uac-BarringFactor corresponding to the multicast/broadcast transmission mode may be acquired by multiplying the uac-BarringFactor corresponding to the unicast transmission mode by a second offset (offset2).

For another example, the uac-BarringTime corresponding to the multicast/broadcast transmission mode may be acquired by adding a third offset (offset3) to the uac-BarringTime corresponding to the unicast transmission mode.

In a specific implementation, the UE may acquire the access control parameter corresponding to the unicast transmission mode from the system information, and then calculate the access control parameter corresponding to the multicast/broadcast transmission mode by applying a corresponding offset.

For example, when the step S102 is performed, in a case of the unicast transmission mode, the AS access control parameter corresponding to the unicast transmission mode of an access category are used to perform the access control.

In a case of the multicast/broadcast transmission mode, a value obtained by applying a certain offset to the AS access control parameter corresponding to the unicast transmission mode of the access category is used to perform the access control.

In a typical application scenario, the UE may determine the transmission mode according to the service type of the data to be transmitted and select a mapping relationship table corresponding to this transmission mode from multiple sets of mapping relationship tables configured in the protocol, core network or system information according to the determined transmission mode. The mapping relationship table includes NAS access control parameters of one or more access IDs and access categories.

For example, the NAS of the UE acquires the NAS access control parameter based on a service through a mapping table, or the core network notifies the UE of a mapping relationship between NAS access control parameters and information (e.g., priority, service identifier, QoS, slice) through signaling.

Further, when the UE performs step S102, the UE may acquire the AS access control parameter according to the access category through the system information, so as to perform an access check process.

During the access control process, if at least one of uac-BarringForAccessIdentity corresponding to one or more access IDs acquired by the UE from the NAS is 0, the access is successful; otherwise, the UE generates a random number and compares the random number with a threshold value, and the access is successful if the random number is lower than the threshold value uac-BarringFactor, or the access fails if the random number is not lower than the threshold value uac-BarringFactor.

If the access is rejected, a random number rand is generated, and the timer T390 is started. After the timer T390 times out, the access control may be initiated again, where T390=(0.7+0.6*rand)*uac-BarringTime.

In view of the above, with the solution of this embodiment, different access control parameters can be selected according to different transmission modes adopted by services when initiating the services, thereby realizing different access controls, which is beneficial to improve the reliability of multicast/broadcast services.

Figure 2:
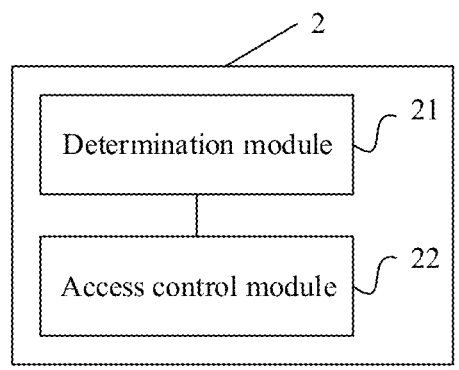
FIG. 2 is a schematic structural diagram of an access control apparatus according to an embodiment of the present disclosure.

FIG. 2 is a schematic structural diagram of an access control apparatus according to an embodiment of the present disclosure. Those skilled in the art understand that the access control apparatus 2 in this embodiment may be used to implement the technical solution of the method described in the embodiment shown in the above FIG. 1.

Specifically, referring to FIG. 2, the access control apparatus 2 in this embodiment may include: a determination module 21, configured to determine a transmission mode according to a service type of data to be transmitted; and an access control module 22, configured to select an access control parameter corresponding to the determined transmission mode to perform an access control. Transmission modes include a unicast transmission mode and a multicast/broadcast transmission mode, and different transmission modes correspond to different access control parameters.

For more details on the working principle and working way of the access control apparatus 2, reference may be made to the relevant description in the above FIG. 1, which will not be repeated here.

In a specific implementation, the above access control apparatus 2 may correspond to a chip with a RRC connection establishment or re-establishment function in the user equipment or correspond to a chip with a data processing function, such as a system-on-a-chip (referred to as SOC), baseband chip, or the like. Alternatively, the access control apparatus 2 may correspond to a chip module that includes a chip with a RRC connection establishment or re-establishment function in the user equipment or corresponds to a chip module that includes a chip with a data processing function or corresponds to user equipment.

In a specific implementation, each module/unit included in each apparatus and product described in the above embodiments may be a software module/unit or may be a hardware module/unit. Alternatively, part of the modules/units may be a software module/unit, and part of the modules/units is a hardware module/unit.

For example, for each apparatus or product applied to or integrated in a chip, modules/units included therein may be implemented by hardware such as circuits, or at least part of the modules/units may be implemented by software programs which run on a processor integrated inside the chip, and the remaining part (if any) of the modules/units may be implemented by hardware such as circuits. For each apparatus and product applied to or integrated in a chip module, the modules/units included therein may be implemented by hardware such as circuits, and different modules/units may be disposed in a same component (e.g., a chip, circuit module) or in different components of the chip module; or, at least part of the modules/units may be implemented by software programs which run on a processor integrated inside the chip module, and the remaining part (if any) of the modules/units may be implemented by hardware such as circuits. For each apparatus and product applied to or integrated in a terminal, modules/units included therein may be implemented by hardware such as circuits, and different modules/units may be disposed in a same component (e.g., a chip, a circuit module) or in different components of the terminal; or, at least part of the modules/units may be implemented by software programs which run on a processor integrated inside the terminal, and the remaining part (if any) of the modules/units may be implemented by hardware such as circuits.

Further, a storage medium is further disclosed in an embodiment of the present disclosure. The storage medium stores computer instructions which when being executed, cause the technical solution of the method described in the embodiment shown in FIG. 1 to be implemented. Preferably, the storage medium may include a computer-readable storage medium such as a non-volatile memory or a non-transitory memory. The storage medium may include ROM, RAM, magnetic disk, optical disk, or the like.

Further, a terminal is also disclosed in an embodiment of the present disclosure. The terminal includes a memory and a processor. The memory stores computer instructions executable on the processor. The processor when executing the computer instructions is configured to implement the technical solution of the method described in the embodiment shown in FIG. 1.

The technical solution of the present disclosure may be applied to 5G (5 Generation) communication system and may be applied to 4G and 3G communication systems and may also be applied to various new communication systems in the future, such as 6G and 7G.

The technical solution of the present disclosure may be applied to different network architectures, including but not limited to a relay network architecture, a dual-link architecture, a Vehicle-to-Everything (communication between vehicle and any object) architecture or other architecture.

The core network described in the embodiments of the present disclosure may be an evolved packet core (EPC) or a 5G Core Network and may also be a new type of core network in a future communication system. The 5G Core Network is composed of a set of devices and implements an access and mobility management function (AMF) for mobility management, and a user plane function (UPF) that provides functions such as packet routing and forwarding and QoS (Quality of Service) management, and a session management function (SMF) that provides functions such as session management, IP address allocation and management. The EPC may be composed of MME that provides functions such as mobility management and gateway selection, Serving Gateway (S-GW) that provides functions such as packet forwarding, and PDN Gateway (P-GW) that provides functions such as terminal address allocation and rate control.

For MBS services, the core network may include several new network elements to implement functions such as packet forwarding, MBS session management, QoS management, and transmission mode switching (switching between unicast and multicast/broadcast transmission modes). Alternatively, these functions may be implemented by network elements in the existing core network.

A base station (BS) in the embodiments of the present disclosure may be referred to as base station equipment, which is a device deployed in a radio access network (RAN) to provide a wireless communication function. For example, the equipment that provides base station functions in 2G network includes a base transceiver station (BTS), the equipment that provides base station functions in 3G network includes Node B (NodeB), the equipment that provides base station functions in 4G network includes evolved NodeB (eNB), the device that provides base station functions in wireless local area networks (WLAN) is an access point (AP), the equipment that provides base station functions in 5G New Radio (NR) includes gNB and next generation eNB (ng-eNB). NR technology is used for communication between gNB and the terminal, and E-UTRA (Evolved Universal Terrestrial Radio Access) technology is used for communication between ng-eNB and the terminal. Both gNB and ng-eNB can be connected to the 5G core network. The base station in the embodiment of the present disclosure also includes equipment that provides base station functions in a new communication system in the future.

A base station controller in an embodiment of the present disclosure is a device for managing a base station, such as a base station controller (BSC) in a 2G network, a radio network controller (RNC) in a 3G network or may refer to a device that controls and manages a base station in a new communication system in the future.

A network side (network) in an embodiment of the present disclosure refers to a communication network that provides communication services for terminals, including a base station of a radio access network, a base station controller of a radio access network, or a device on the core network side.

The terminal in an embodiment of the present disclosure may refer to various forms of user equipment (UE), access terminal, subscriber unit, subscriber station, mobile station, mobile station (built as MS), remote station, remote terminal, mobile device, user terminal, terminal equipment, wireless communication device, user agent or user device. The terminal equipment may be a cellular phone, a cordless phone, a session initiation protocol (SIP) phone, a wireless local loop (WLL) station, a personal digital assistant (PDA), a handheld device, computing device or other processing device connected to a wireless modem, in-vehicle device, wearable device with wireless communication capability, terminal equipment in a future 5G network or terminal equipment in future evolved public land mobile network (PLMN), which is not limited in the embodiments of the present disclosure.

In the embodiments of the present disclosure, the unidirectional communication link from the access network to the terminal is defined as the downlink, data transmitted on the downlink is downlink data, and the transmission direction of the downlink data is referred to as the downlink direction. The unidirectional communication link from the terminal to the access network is defined as the uplink, data transmitted on the uplink is uplink data, and the transmission direction of the uplink data is referred to as the uplink direction.

It should be understood that the term "and/or" herein is only an association relationship to describe associated objects, indicating that there may be three kinds of relationships. For example, A and/or B may indicate a first case that A exists alone, a second case that A and B both exist, or a third case that B exists alone. In addition, the character "/" used herein indicates that there is an "or" relationship between associated objects before and after the character "/".

The "multiple" used in the embodiments of the present disclosure refers to two or more.

The expressions such as "first", "second" or the like in the embodiments of the present disclosure are only used for illustrating and distinguishing described objects, and do not indicate the order of the described objects or a special limitation on the number of devices in the embodiments of the present disclosure, which does not constitute any limitations of the embodiments of the present disclosure.

The expression "connection" in the embodiments of the present disclosure refers to various connection ways such as direct connection or indirect connection, so as to realize communication between devices, which is not limited in the embodiments of the present disclosure.

It should be understood that, in the embodiments of the present disclosure, the processor may be a central processing unit (CPU), or the processor may be other general-purpose processor, a digital signal processor (DSP), an application specific integrated circuit (ASIC), a field programmable gate array (FPGA) or other programmable logic device, a discrete gate or a transistor logic device, a discrete hardware component, or the like. The general-purpose processor may be a microprocessor, or the processor may be any conventional processor or the like.

It should also be understood that the memory in the embodiments of the present disclosure may be a volatile memory or a non-volatile memory or may include both of a volatile memory and a non-volatile memory. The non-volatile memory may be a read-only memory (ROM), a programmable read-only memory (programmable ROM, PROM for short), and an erasable programmable read-only memory (erasable PROM, EPROM for short), an electrically erasable programmable read-only memory (electrically EPROM, EEPROM for short) or a flash memory. The volatile memory may be a random access memory (RAM), which acts as an external cache. By way of an example rather than a limitation, various random access memories (RAM) are available, such as a static random access memory (static RAM, SRAM for short), a dynamic random access memory (DRAM), a synchronous dynamic random access memory (synchronous DRAM, SDRAM for short), a double data rate synchronous dynamic random access memory (double data rate SDRAM, DDR SDRAM for short), an enhanced synchronous dynamic random access memory (enhanced SDRAM, ESDRAM for short), a synchlink dynamic random access memory (synchlink DRAM, SLDRAM for short) and a direct rambus random access memory (direct rambus RAM, DR RAM for short).

The above embodiments may be implemented in whole or in part by software, hardware, firmware, or any other combination. When implemented by software, the above-described embodiments may be implemented in whole or in part in the form of a computer program product. The computer program product includes one or more computer instructions or computer programs. When the computer instructions or computer programs are loaded or executed on a computer, all or part of the processes or functions described in the embodiments of the present disclosure are generated. The computer may be a general-purpose computer, a special-purpose computer, a computer network, or other programmable device. The computer instructions may be stored in a computer-readable storage medium or may be transmitted from one computer-readable storage medium to another computer-readable storage medium, for example, the computer instructions may be transmitted from a website site, a computer, a server, or a data center to another website site, computer, server, or data center by wired or wireless way. The computer-readable storage medium may be any available medium that can be accessed by a computer or a data storage device such as a server, a data center, or the like that contains one or more sets of available media. The usable medium may be a magnetic medium (e.g., a floppy disk, a hard disk, a magnetic tape), an optical medium (e.g., DVD), or a semiconductor medium. The semiconductor medium may be a solid state drive.

It should be understood that, in various embodiments of the present disclosure, the sequence number of the above-mentioned process does not indicate the order of execution, and the execution order of each process should be determined by its functions and internal logic, which should not constitute any limitation on the implementing process in the embodiments of the present disclosure.

In the several embodiments provided in the present disclosure, it should be understood that the disclosed method, apparatus, and system may be implemented in other manners. For example, the apparatus embodiments described above are only illustrative. For example, the division of units is only a logical function division, and other division ways may be applied in actual implementation. For example, multiple units or components may be combined or may be integrated into another system, or some features may be ignored or not implemented. In addition, the shown or discussed mutual coupling or direct coupling or communication connection may be through some interfaces, and the indirect coupling or communication connection of devices or units may be in electrical, mechanical, or other forms.

The units described as separate components may or may not be physically separated, and components displayed as units may or may not be physical units, that is, may be located in one place or may be distributed to multiple network units. Some or all of the units may be selected according to actual needs to achieve the purpose of the solution in the embodiments.

In addition, various functional units in the embodiments of the present disclosure may be integrated into one processing unit, or each unit may be physically included individually, or two or more units may be integrated into one unit. The above integrated unit may be implemented in the form of hardware or may be implemented in the form of hardware plus software functional unit.

The above integrated unit implemented in the form of a software functional unit may be stored in a computer-readable storage medium. The above software functional unit is stored in a storage medium and includes several instructions to cause a computer device (such a personal computer, a server, or a network device, etc.) to execute some steps of the methods described in the various embodiments of the present disclosure. The aforementioned storage media include various media that can store program codes, such as U disk, mobile hard disk, read-only memory (ROM), random access memory (RAM), magnetic disk, optical disk or the like.

Although the present disclosure is disclosed above, the present disclosure is not limited thereto. Any person skilled in the art may make various changes and modifications without departing from the spirit and scope of the present disclosure. Therefore, the protection scope of the present disclosure should be based on the scope defined by the claims.

The invention claimed is:

1. An access control method, comprising:
   determining a transmission mode according to a service type of data to be transmitted; and
   selecting an access control parameter corresponding to the determined transmission mode to perform an access control,
   wherein transmission modes comprise a unicast transmission mode and a multicast/broadcast transmission mode, and different transmission modes correspond to different access control parameters;
   wherein the access control parameter comprises a non-access stratum (NAS) access control parameter and an access stratum (AS) access control parameter,
   wherein the NAS access control parameter comprises a mapping relationship table between an access category and one or more access IDs,
   wherein for a same access category, different transmission modes correspond to different AS access control parameters.

2. The access control method according to claim 1, wherein the access control parameter corresponding to the transmission mode is acquired through at least one of the following ways: being configured by a protocol, being configured by a core network, and being acquired by system information.

3. The access control method according to claim 1, wherein the service type comprises a type of a service that needs to perform data transmission using the multicast/broadcast transmission mode under a radio resource control (RRC) connected status.

4. A non-transitory computer-readable storage medium, wherein the storage medium stores computer instructions which, when executed by a processor, cause the processor to:
   determine a transmission mode according to a service type of data to be transmitted; and
   select an access control parameter corresponding to the determined transmission mode to perform an access control,
   wherein transmission modes comprise a unicast transmission mode and a multicast/broadcast transmission mode, and different transmission modes correspond to different access control parameters;
   wherein the access control parameter comprises a non-access stratum (NAS) access control parameter and an access stratum (AS) access control parameter,
   wherein the NAS access control parameter comprises a mapping relationship table between an access category and one or more access IDs,
   wherein for a same access category, different transmission modes correspond to different AS access control parameters.

5. A terminal comprising a memory and a processor, wherein the memory stores computer instructions executable on the processor, and the processor, when executing the computer instructions, is configured to:
   determine a transmission mode according to a service type of data to be transmitted; and
   select an access control parameter corresponding to the determined transmission mode to perform an access control,
   wherein transmission modes comprise a unicast transmission mode and a multicast/broadcast transmission mode, and different transmission modes correspond to different access control parameters;
   wherein the access control parameter comprises a non-access stratum (NAS) access control parameter and an access stratum (AS) access control parameter,
   wherein the NAS access control parameter comprises a mapping relationship table between an access category and one or more access IDs,
   wherein for a same access category, different transmission modes correspond to different AS access control parameters.

6. The non-transitory computer-readable storage medium according to claim 4, wherein the access control parameter corresponding to the transmission mode is acquired through at least one of the following ways: being configured by a protocol, being configured by a core network, and being acquired by system information.

7. The non-transitory computer-readable storage medium according to claim 4, wherein the service type comprises a type of a service that needs to perform data transmission using the multicast/broadcast transmission mode under a radio resource control (RRC) connected status.

8. The terminal according to claim 5, wherein the access control parameter corresponding to the transmission mode is acquired through at least one of the following ways: being configured by a protocol, being configured by a core network, and being acquired by system information.

9. The terminal according to claim 5, wherein the service type comprises a type of a service that needs to perform data transmission using the multicast/broadcast transmission mode under a radio resource control (RRC) connected status.

* * * * *